(12) United States Patent
Kremser et al.

(10) Patent No.: US 11,431,547 B2
(45) Date of Patent: Aug. 30, 2022

(54) FIELD BUS-TRANSMITTED CONTROL INSTRUCTIONS FOR FIELD DEVICES

(71) Applicant: Festo SE & Co. KG, Esslingen (DE)

(72) Inventors: Rolf Kremser, Kirchheim unter Teck (DE); Olaf Westrik, Solms (DE)

(73) Assignee: Festo SE & Co. KG, Esslingen (DE)

(*) Notice: Subject to any disclaimer, the term of this patent is extended or adjusted under 35 U.S.C. 154(b) by 0 days.

(21) Appl. No.: 16/833,466

(22) Filed: Mar. 27, 2020

(65) Prior Publication Data
US 2020/0313951 A1   Oct. 1, 2020

(30) Foreign Application Priority Data

Mar. 29, 2019   (DE) .................. 10 2019 108 271.4

(51) Int. Cl.
| | | |
|---|---|---|
| *G06F 15/16* | (2006.01) | |
| *H04L 9/40* | (2022.01) | |
| *H04L 67/10* | (2022.01) | |
| *H04L 43/10* | (2022.01) | |
| *H04L 41/22* | (2022.01) | |

(52) U.S. Cl.
CPC .............. *H04L 29/06* (2013.01); *H04L 41/22* (2013.01); *H04L 43/10* (2013.01); *H04L 67/10* (2013.01)

(58) Field of Classification Search
CPC ......... H04L 29/06; H04L 67/10; H04L 43/10; H04L 41/22
See application file for complete search history.

(56) References Cited

U.S. PATENT DOCUMENTS

| | | | | |
|---|---|---|---|---|
| 2016/0274552 | A1* | 9/2016 | Strohmenger | G06Q 10/06 |
| 2019/0072940 | A1* | 3/2019 | Schnabel | G05B 19/4148 |

FOREIGN PATENT DOCUMENTS

| | | |
|---|---|---|
| DE | 102017215508 A1 | 3/2019 |
| EP | 3070548 A2 | 9/2016 |

OTHER PUBLICATIONS

IEC TR 61158-1, Technical Report, Digital data communications for measurement and control—Fieldbus for use in Industrial control systems—Part 1: Overview and guidance for the IEC 61158 series, 2003, First Edition, Switzerland.
Office Action issued in German Patent Application No. DE 10 2019 108 271. 4, dated Dec. 13, 2019 (from which this application claims priority) and English language translation thereof.

\* cited by examiner

*Primary Examiner* — Padma Mundur
(74) *Attorney, Agent, or Firm* — Falk Ewers; Ewers IP Law PLLC (57) ABSTRACT

A diagnostic module for technical diagnosis of field devices operated in an automation plant, a diagnostic system, a method, and a computer program are provided. The diagnostic module includes a local control device which has a field bus interface and is not web-enabled, a field device, which has a web-based interface, from a number of field devices, and a coupling module with a web interface for data communication with a cloud-based server and in particular for reception of an analysis message from the cloud-based server and with a conversion module for generation of a field bus message from the received analysis message and for transmission of the field bus message to the control device. The diagnostic module further includes a field bus for internal communication between the devices of the automation plant and for forwarding the generated field bus message to the control device for control of the automation plant.

14 Claims, 6 Drawing Sheets

FIELD BUS-TRANSMITTED CONTROL INSTRUCTIONS FOR FIELD DEVICES

CROSS REFERENCE TO RELATED APPLICATIONS

This application claims priority to German patent application DE 10 2019 108 271.4, filed Mar. 29, 2019, the entire content of which is incorporated herein by reference.

TECHNICAL FIELD

The present disclosure relates to the technical diagnosis of field devices in an automation plant, e.g., in a production plant comprising actuators and sensors, and relates in particular to a diagnostic module, a diagnostic system, a method and a computer program.

BACKGROUND

Fundamentally high quality, robustness and availability requirements are placed upon field devices in different types of automation plants. A failure or malfunction of a field device in a process can cause extremely high costs, particularly in the event of a manufacturing stoppage caused thereby. Therefore, in field devices a high degree of technical effort is deployed in order to considerably reduce the risk of malfunctions or to be able to recognize and report a defect independently. Functions are integrated into the field device repeatedly in a redundant manner, measurement results are monitored and verified internally on a permanent basis. The requirements for safeguarding against failure for the field device increase with its field of application (e.g., in nuclear power plants). Therefore, during monitoring of field devices it is necessary to ensure that the devices involved function in an error-free manner and any failure is detected in the most timely manner possible and even before any disruption.

This monitoring and analysing task uses methods from the field of predictive maintenance which analyse a large amount of monitoring data from the field devices. These methods are frequently based upon predictive maintenance algorithms. These algorithms must process a large volume of data and require a large computing capacity with corresponding further technical resources (memory, etc.).

For this purpose, it is known in the prior art to swap this computing-intensive analysis task out to an external computing unit, in particular to the cloud, which is connected to the automation plant via the Internet or a web interface. An example of such a system is disclosed in EP 3 070 548 A2. However, this document disadvantageously requires that the local controls on site at the automation plant are cloud-enabled or have cloud connectivity.

However, should monitoring be necessary for older plants which are fitted with control means which do not yet, or not yet completely, have cloud connectivity, the important monitoring tasks cannot be carried out and applied. This constitutes a problem.

SUMMARY

Proceeding therefrom, it is an object of the present disclosure to provide an approach with which even "old" local control component parts, such as PLCs, which do not have cloud connectivity, can be monitored with a cloud-based server. Therefore, monitoring is to be expanded and the automation system is to be made more reliable as a whole.

This object is achieved by a diagnostic module for technical diagnosis of field devices which can be operated in an automation plant. For this purpose, the diagnostic module is formed with a local control device (e.g., a PLC) which has a field bus interface, e.g., PROFINET. However, the control device is not web-enabled or does not command an external web-based interface and is therefore not cloud-enabled. In order also to be able to address such control devices by a cloud server the automation plant and in particular the diagnostic module comprises a number of field devices and at least one such field device which has a web-based interface (or is cloud-enabled). Furthermore, a coupling module (e.g., an IoT gateway) is formed on the diagnostic module. The coupling module has a web interface (which can be implemented, e.g., as a GUI or as a web service) for data communication with a cloud-based server and in particular for reception of an analysis message (which represents a result of a predictive maintenance analysis algorithm) from the cloud-based server. The coupling module further comprises a conversion module for generation of a field bus message from the received analysis message. The coupling module can be instructed, or can instruct another transmission module, to transmit the generated field bus message to the control device. A field bus serves for internal communication between the devices of the automation plant and in particular for forwarding the generated field bus message to the control device for monitored control of the automation system. In a exemplary embodiment of the disclosure at least one of the field devices can be provided with such a coupling module and therefore can be equipped with an external interface to the cloud-based server.

The disclosure has the technical advantage that even old controllers, which do not yet have web-connectivity, can be incorporated in a server-based monitoring procedure. Therefore, the reliability can be increased and the control quality improved. This is typically achieved in that field devices readily used in the plant are caused to transmit diagnostic messages in the form of the analysis message from the cloud or from the server to the field devices and/or actuators/sensors, attached in the plant, by means of standard field bus messages and mechanisms relating thereto for data exchange to the controller (e.g. PLC) in order to actuate any further diagnostic and/or error-correction measures. The coupling module can—but doesn't have to—be implemented on one of the field devices.

In an exemplary embodiment of the disclosure, the field device and the coupling module are separate component parts. Therefore, the diagnostic module becomes more modular since the connectivity functionality can be swapped out to a dedicated component part. In an alternative embodiment of the disclosure, the coupling module can be integrated into the field device. Component costs can therefore be reduced, safeguarding against failure can be increased and space required can be lowered.

In an exemplary embodiment of the disclosure, the control device, the at least one field device and the coupling module are in data connection via the field bus. This is a bus system, typically according to standard IEC 61158 (Digital data communication for measurement and control—Fieldbus for use in industrial control systems) or according to another standard (e.g., real time-Ethernet).

In another aspect, the disclosure relates to a diagnostic system for technical diagnosis of field devices. The diagnostic system is equipped with a diagnostic module, as described above, and additionally comprises a cloud server which is connected to the diagnostic module in terms of data technology via the web interface. The cloud server can be designed for different tasks, in particular for executing a predictive maintenance algorithm.

According to an exemplary embodiment of the diagnostic system the server has a web interface and comprises a processor, wherein the processor is designed for execution of a predictive maintenance algorithm which calculates an analysis message from monitoring data detected at the field devices and transmitted to the server.

The achievement of the object has been described above in relation to devices (diagnostic module, system). Features, advantages or alternative embodiments mentioned herein are likewise also to be transferred to the other claimed subject matter and vice versa. In other words, the method and the computer program can also be developed with the features which are described and/or claimed in conjunction with the module or system. In so doing, the corresponding functional features of the method are embodied by corresponding physical modules, in particular by hardware modules or microprocessor modules, of the system or of the product, and vice versa.

In a further aspect, the disclosure relates to a method for diagnosis of field devices. The diagnostic method comprises the following method steps:
  transmitting monitoring data from the field devices (which participate in the diagnostic method and are attached to the field bus) to a coupling module which serves as a gateway;
  initiating a transmission of the monitoring data from the coupling module to a cloud-based server;
  preparing and triggering execution of a predictive maintenance algorithm on the server based on the received monitoring data in order to generate an analysis message;
  receiving the generated analysis message at the coupling module;
  transmitting the analysis message from the coupling module to a conversion module;
  generating a field bus message from the analysis message on the part of the conversion module;
  transmitting the field bus message from the conversion module to a control device for modified control of the automation plant based on the field bus message.

In an exemplary embodiment of the method, in addition to the monitoring data, process data are also detected at the field device. The process data can be prepared for transmission to the server. The process data can be processed at the server and/or intermediately stored. During transmission of the analysis message from the server to the coupling module, the process data can be appended to the analysis message or integrated therein either directly (from the intermediate memory in unprocessed form) or in processed form. "In processed form" means in this case further processing of the process data, which can be carried out client-side (in modules in the field, e.g., for aggregation of process data) and/or server-side and serves, inter alia, to compute a diagnostic message. The diagnostic message can comprise e.g. statistical evaluations. Alternatively, a message packet can be formed from the process data together with the analysis message, the message packet being transmitted to the coupling module. This has the advantage that the controller gets so to speak via a detour in terms of data technology (namely via the server) knowledge also of process data from the field devices or other devices or component parts of the automation plant, although the controller has no web-connectivity.

The process data can also fundamentally be transmitted via the field bus to other field devices—but then in unprocessed form. In the case of indirect transmission of the process data from field devices to further control and/or field devices by means of transmission to the server which therefore serves as an intermediate processing node, the process data can be processed. In other words, manipulated process data are appended to the analysis message or a message packet with manipulated process data is generated. The manipulation can comprise, e.g., a time-based evaluation or a match with reference values or an indication as to how the process data are present in the statistical comparison (e.g., in comparison with an average value). The process data can typically be transmitted only to selected field devices, in particular to those which generate process data of the same type (e.g., process data of an end position sensor are transmitted only to further end position sensors and e.g. not to a temperature sensor). The processing at the cloud server can also be used to generate additional input/output data (as manipulated process data) which are transmitted to the controller (e.g., PLC) typically together with the normal process data.

In a further exemplary embodiment of the method, a plurality of field devices participate in the diagnostic method. The field device is therefore a field device of a number of field devices. In order to be able to allocate the messages to be exchanged (monitoring data, analysis message) unambiguously to the (correct) field device, an identification mechanism for authentication of the respective message or the data is required. For this purpose, an identifier can be used which is coupled to the respective data to be transmitted (e.g., monitoring data) so that the server can distinguish the monitoring data according to the origin thereof and can allocate them to an original field device. Therefore, the server can process the detected monitoring data in a field device-specific manner and generate the analysis messages likewise in a field device-specific manner. For this purpose, the analysis message can be coupled to the identifier in a suitable manner (as described above) so that the coupling module receives the respective analysis message together with the identifier and then can transmit same in a dedicated manner to the field device identified by means of the identifier. This is useful, e.g., when a specific field device has been analysed as being defective or likely to be defective (by analysis at the server) and this alert is to be transmitted directly to the respective field device so that a warning notice can be output, e.g., locally. In addition, the analysis message can also still be forwarded to the controller; but this is not necessarily required.

In a further exemplary embodiment of the method, the analysis message is output directly after reception at the diagnostic module and in particular at the field device which has been identified by the identifier. This can take place typically, e.g., in visual form (e.g., by means of LEDs) or in another form. In this way, reaction to the server-side analysis can be quicker and take place directly at the field device.

In a further exemplary embodiment of the method, the predictive maintenance algorithm processes, in addition to the monitoring data detected at the field devices, also historical data and/or reference data (e.g. from other field devices) in order to generate the analysis message. The analysis can thereby be carried out in a more comprehensive manner and the analysis result in the form of the analysis message becomes more reliable.

In a further exemplary embodiment of the method, the predictive maintenance algorithm has a pre-configured functionality and serves to compute diagnostic data. For this purpose, a predictive maintenance algorithm can typically be used. One advantage is that the maintenance of the plant can be managed via the cloud or the cloud-based server. In a first exemplary embodiment, the predictive maintenance algorithm can be designed as a switching cycle counter and determine (count) data in the field device, but the evaluation takes place in the cloud. Thereby, the field device counts the switching cycles of an output. The data aggregated at the field device are transmitted to the server in the cloud and at the server, the threshold values may be determined adaptively, based on additional information with respect to the application. When the algorithm in the cloud determines that a maintenance operation is necessary, this is transmitted to the field device by means of the analysis message. Thereupon, the field device can in turn generate a diagnostic alert for the controller/PLC. The switching cycle counter is an example of a predictive maintenance algorithm. The field device counts the number of switching cycles of an output. These switching cycles can then be allocated to a specific cylinder in the plant. The algorithm can be executed in the cloud and has extended knowledge of the installed cylinder and the application. With this knowledge (in the form of data sets) it is possible to compute centrally, in the cloud, whether the cylinder needs to be changed owing to the number of travel cycles. The necessity of the change can then be transmitted from the cloud via the intermediate nodes/device to the non-cloud-enabled application (at the control device). A second exemplary embodiment relates to travel time monitoring of a cylinder. Measurement values relating to this from the field device are evaluated in the cloud. Therefore, in one development, not only the switching cycles but also the corresponding travel times of a cylinder can be detected, which are transmitted into the cloud or to the server for the purpose of the evaluation. In one development, the server can recognise deviations and changes over a relatively long period of time. This proves to be particularly advantageous when further plant data, e.g., temperature, oscillation, operating times, etc., are detected and considered. The predictive maintenance algorithm on the server can evaluate whether the plant is in a normal operating state or wear is present or even if the component part has specifically failed. When a failure has been recognised it is advantageous if a corresponding diagnostic message (e.g., as part of the analysis message) is transmitted directly with location information (with respect to the defective component part) to the controller or PLC.

Generally, the diagnosis at field level is characterized in that the application in the controller reacts directly to specific diagnostic events by directly triggering processes at the machine or the automation plant are triggered directly (e.g., by stopping the machine). Therefore, it is particularly important to provide the analysis message with a diagnostic message as quickly as possible on site in order to increase process reliability.

In an exemplary embodiment, the analysis message and/or field bus message is not transmitted cyclically from the server to the plant, in particular to the coupling module but only in an event-based manner. In a preparation phase it is possible to configure which events are to serve as a trigger for transmission of the message. Thus, e.g., it is possible to arrange that the analysis message and/or field bus message is to be transmitted only in the event of a diagnosis (or error case). Therefore, the method can be applied even in the case of small network resources (bandwidth) since few transmission resources are required.

In a further exemplary embodiment of the method, on the part of the field device, the field bus message is generated from the analysis message or in other words the analysis message (from the server) is converted into a field bus message (for the controller). The conversion can comprise a protocol conversion and/or a format adaptation. Thus, the data can be transmitted to and/or from the cloud (the cloud-based server), e.g., with the MQTT protocol. In the field device, this message can be converted into a PROFI-NET-specific field bus message with a diagnostic message.

The object is further achieved by a computer program, comprising computer program code, for carrying out all of the method steps of the method described in more detail above when the computer program is executed on a computer. In this connection, it is also possible for the computer program to be stored on a computer-readable medium.

The object is further achieved by a computer program product, comprising computer program code, for carrying out all of the method steps of the method described in more detail above when the computer program is executed on a computer. In this connection, it is also possible for the computer program to be stored on a computer-readable medium. The computer program product can be designed, e.g., as a stored, executable file, optionally comprising further components (such as libraries, drivers etc.) or as a computer comprising the already installed computer program.

The terms used in this application are explained in greater detail hereinafter.

A diagnostic module is an electronic module which can be distributed over a plurality of component parts and is designed with the functionality of a technical diagnosis, in particular comprising methods for predictive maintenance (in the sense of predictive upkeep) with automatic or semi-automatic instructions for corrective upkeep measures for field devices. In particular, the diagnostic module which is implemented locally on devices of the automation plant can access computations carried out centrally. The diagnostic module is arranged to carry out the diagnostic method. The diagnostic module can be designed as a client of a central diagnostic service (which runs on the server). The computations carried out centrally on the server can be carried out by maintenance software which evaluates the transmitted monitoring data and generates an analysis message which comprises instructions to implement control measures and/or diagnostic measures when a possible failure of a field device or of other components of the automation plant is recognised early by the maintenance software. Defective component parts which will possibly soon result in the plant experiencing a stoppage are thus identified independently of the typical maintenance times and can be replaced before damage actually occurs. Predictive maintenance thus designates a maintenance procedure which is based on the evaluation of sensor, process and machine data—referred to as monitoring data herein—and carries out predictive inspections or analyses thereupon. By means of the real time processing of the underlying data, prognoses are possible which form the basis for maintenance able to meet requirements and consequently for the reduction in downtimes. For this purpose, in addition to the interpretation of sensor data, a combination of real time analysis technology and specific databases (e.g., in-memory databases) is needed in order to achieve a sufficiently high access speed. Predictive maintenance techniques are used to determine the state of devices in operation in order to predict when maintenance is to be carried out. This allows cost savings to be achieved with respect to routine or time-dependent preventative maintenance because work can be carried out only when it is actually necessary. Within the scope of the disclosure, it is preferred that the analysis is carried out in parallel with the operation of the plant in order to avoid standstill periods.

In accordance with the disclosure, the monitoring data and/or the process data are used to estimate the actual state of the field device. The monitoring data can be data of different types and/or which are detected using different methods, e.g., infrared, acoustic (partial discharge and ultrasound), corona detection, oscillation analysis, sound level measurements, etc. The monitoring data are typically detected during operation of the field device. The monitoring data relate to the actual state of the plant with the field devices thereof and—in contrast to the method for "preventive maintenance"—not to the average or expected service life, in order to predict when maintenance is necessary. Alternatively, and additionally to the monitoring data, further data can be detected and/or further data can be derived computationally from the detected monitoring data. Thus, e.g., on the basis of the detected monitoring data, further processing can be triggered in order to obtain new findings relating to the process performance data therefrom. This is typically computed at the server, e.g., in terms of the generation of collaborative process automation data. Thus, it is possible to conclude, e.g., that there is a fault in a superordinate component when all or a sufficiently high number of subordinate components encounter a fault or do not show sufficient performance behaviour.

The monitoring data are transmitted to the coupling module which can be designed as a gateway. This can take place according to a PUSH or PULL operation. The coupling module forwards the monitoring data to the cloud-based server. It is also possible to configure when the transmission to the cloud should take place and/or if it takes place after entry of events to be configured. Similarly, the reception (retrieval of the result of the predictive maintenance analysis) of the analysis message can be configured. Thus, the diagnostic module can provide, e.g., a large number of available standard monitoring data which can be subscribed to by the cloud application typically according to the publish/subscribe method. The data for the transmission can be selected at the cloud server (typically in a cloud/dashboard). Alternatively, the following exemplary embodiment is feasible: programmable or configurable pre-processing is running in the field device. Only aggregated data are then transmitted to the cloud or to the server. For example, the travel time of a cylinder can be determined based on the switching time points of the cylinder switch. In the field device only AVG/MIN/MAX values are detected and transmitted to the cloud. Therefore, advantageously lower requirements are placed on the data transmission, since only a smaller proportion of the data volume must be transmitted.

The coupling module has the functionality of a gateway node and has a cloud-based interface (web interface) to the server. The web interface may, e.g., be implemented as a web browser. The web interface could be http-based (http—Hypertext Transfer Protocol) or could be operated with other transfer protocols (especially stateless, connection-oriented, packet switched) of the TCP/IP-reference model, for example with the FTP (File Transfer Protocol). The web interface is characterized by the fact that the web interface is also active during cyclical operation and therefore is active after commissioning the automation plant and is used for the transfer of control data between the coupling module and the cloud-based server. In particular, the coupling module is configured to receive (open or closed loop) control data and/or diagnosis data (e.g., in form of message packages) during cyclical operation from the cloud-based server. The coupling module serves to receive the analysis message from the server and to process same or to forward it to the conversion module. The coupling module can furthermore have the functionality to transmit the monitoring data and/or process data from the field devices to the server. The coupling module can provide further functions and in particular perform an aggregation of monitoring data and/or process data before these are gathered and transmitted to the server. In particular, the functionality of the coupling module can be formed only on selected devices and/or nodes. Thus, provision can be made that only selected field devices are equipped with the gateway functionality.

A field device is a technical device in the field of automation technology, which is directly related to a production process, e.g., a CPX-AP. In automation technology, the term "field" designates the area outside control cabinets or control rooms. Therefore, field devices can be both actuators (control elements, valves etc.) and sensors (measuring transducers) in factory and process automation. The field devices are connected to a control and management system, mostly via a field bus. The field devices can be designed having sensors in order to detect, generate or aggregate the monitoring data so that the data can be used in an evaluated manner for regulation, control and further processing. The field device can also be formed with a user interface, e.g., to visualise and display the monitoring data and/or the analysis result in the form of the analysis message (e.g., valve opened/closed, pressure, throughflow, temperature) for the personnel. The field devices are part of an automation plant which can comprise further devices (e.g. industrial robots).

The control device is an electronic module which is used for controlling and/or regulating a machine or automation plant having a group of field devices and is programmed on a digital basis. In particular, it can be a programmable logic controller (PLC). In the simplest case, a control device has inputs, outputs, an operating system (firmware) and an interface, via which the user program can be loaded. The user program determines how the outputs can be switched in dependence upon the inputs. The operating system ensures that the current status of the transmitters is always available to the user program. On the basis of this information, the user program can switch the outputs such that the machine or the automation plant functions in the desired manner. The control device is connected to the automation plant with its field devices by means of sensors and actuators. Status displays are usually present. The sensors are not, as previously, connected to the inputs of the control device but transmit their monitoring data at least partially to the coupling module and represent the conditions in the machine or in the field device. The transmission of the data does not necessarily take place exclusively to the coupling module but in most cases also to the connection to the controller/PLC. Examples of sensors are, e.g., buttons, photoelectric sensors, incremental encoders, end switches or even temperature sensors, fill level sensors, etc. The actuators are connected to the outputs of the control device and provide the option of controlling the field devices in the plant. Examples of actuators are contactors for switching on electric motors, electric valves for hydraulics or compressed air, but also modules for drive controllers (motion control, rotational speed control with controlled acceleration or deceleration, stepping motor controllers). In accordance with the disclosure and advantageously, it is not mandatory that the control unit needs to be equipped with an external network interface for the exchange of closed and open loop control data. In particular, the control unit can only be equipped with a fieldbus interface. Alternatively, the control unit can be equipped with further local (plant-internal)

interfaces. This has the advantage that also control units of an older type may be used for a cloud-based diagnostic procedure, which are not yet 'cloud-enabled' (have cloud ability) or do not have a cloud interface, to exchange (especially receiving) open and closed loop control data with a cloud based server during plant operation.

In accordance with the disclosure, two different types of interfaces for the automation plant are provided: an internal interface for communication between the devices (field devices, control device, coupling module) within the automation plant, and an external interface designated in this case as a cloud-interface or web-interface.

A field bus is used for the first internal interface for communication within the automation plant. Known field bus systems can be used for this, e.g., PROFIBUS, Interbus, AS-Interface (formerly: ASI), real time-Ethernet systems such as PROFINET or EtherCAT and wireless transmission systems.

The second external interface is implemented on a component part referred to as the coupling module (also referred to as the 'gateway'). The coupling module can be formed as a separate IoT gateway. Alternatively, the coupling module can also be implemented in a dedicated field device. With this, the field device assumes an interface-forming additional function. The coupling module can be arranged to pre-process the monitoring data before they are transmitted to the cloud. When data are previously aggregated and/or syntactically analysed and/or compressed and/or encrypted, the amount of data to be forwarded to the cloud is reduced to a minimum, which can have a considerable impact on reaction times and network transmission costs. In addition, the system is rendered more secure when encryption takes place. The second external interface is typically not implemented in the control unit.

The conversion module has the functionality to generate a field bus message starting from, or on the basis of, the received analysis message (which, so to speak, serves as an input for the conversion module). The functionality of the conversion module can be implemented only on a selection of devices. The analysis message comprises server-side computer diagnostic data. The conversion module can furthermore be arranged to transmit the generated field bus message itself to the control device or to entrust a further authority therewith. In a simple embodiment of the disclosure, the conversion module performs in particular a protocol conversion: the analysis message with the http-based format is converted into a field bus message in field bus format. In further embodiments, the conversion module performs still further processing steps in order to generate the field bus message which comprises diagnostic data. For example, in this case, a receiver specification can take place, i.e., a determination of which devices in the field the field bus message is to be sent to. Therefore, the set of receivers can be reduced so that, e.g., only those controllers which are to initiate diagnostic and/or error correction measures will receive the field bus message.

"Modified control" relates to the fact that the control takes place in a modified manner in response to the analysis message and therefore to the result of the predictive maintenance algorithm which has been executed at the server on the basis of the monitoring data. Thus, individual field devices can be switched off or otherwise controlled in due time and before they encounter a fault.

The analysis message is a data set which comprises control instructions which are to be implemented at the control device for the purposes of modified control. However, the analysis message cannot be read-in and applied directly at the control device (since the control device can be addressed only via the field bus) but must first be converted into a field bus message. The conversion module serves this purpose.

BRIEF DESCRIPTION OF THE DRAWINGS

The disclosure will now be described with reference to the drawings wherein.

DESCRIPTION OF EXEMPLARY EMBODIMENTS

The disclosure serves for technical monitoring of field devices which are controlled via a control device which does not have a web interface. The monitoring should be carried out using procedures and processes which are implemented on a cloud server. In particular, methods for predictive maintenance should be carried out.

Figure 1:
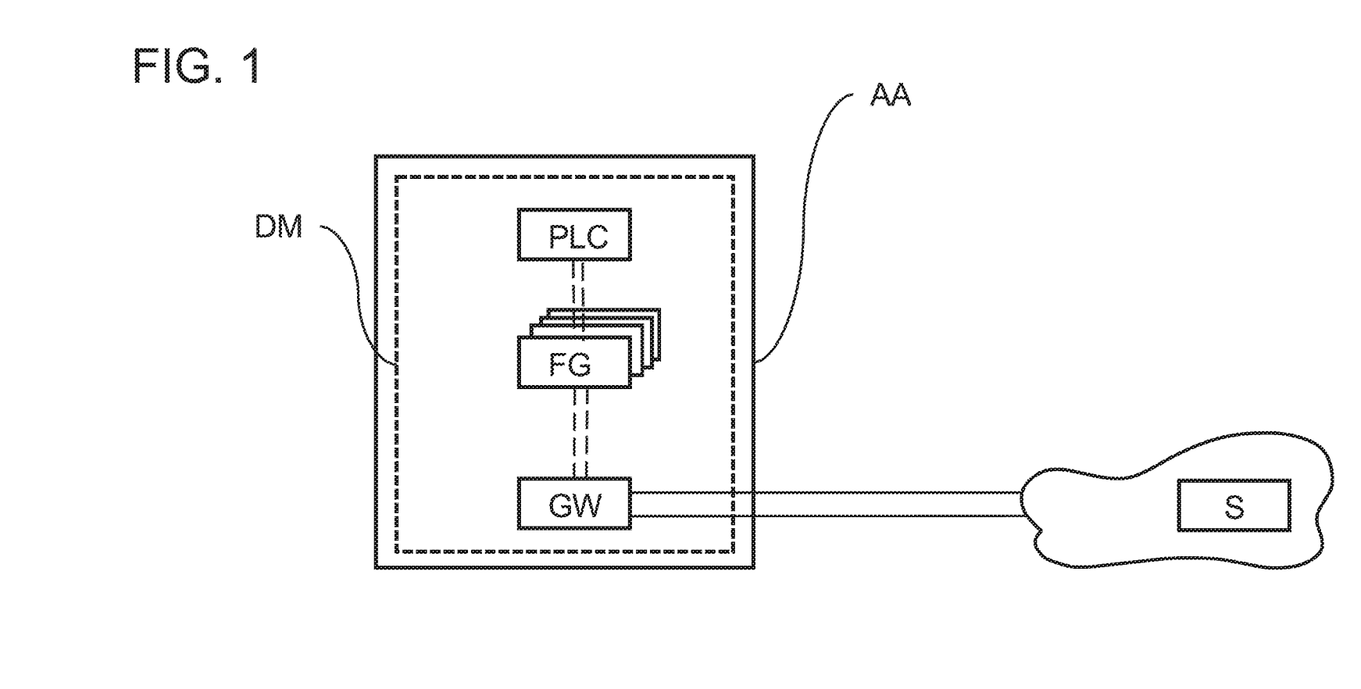
FIG. 1 is an overview of the diagnostic system in accordance with the disclosure with a diagnostic module and a cloud-based server.

FIG. 1 schematically illustrates the diagnostic system. It comprises, at the automation plant AA, the diagnostic module DM and, at the cloud, a server S accessible via a web interface. The diagnostic module DM comprises a number of field devices FG, such as actuators and sensors, which are controlled by at least one (local) controller which can be designed as a programmable logic controller and is therefore referred to by the reference PLC. Furthermore, the diagnostic module is designed with a coupling module which functions as a gateway into the cloud and is therefore referred to by the reference GW. The coupling module is also designated hereinunder synonymously with the gateway GW. The gateway GW implements a web interface WS-GW which serves for access to the cloud-based server S. As shown schematically in FIG. 1, the programmable logic controller PLC does not have internet connectivity but is merely connected to a bus B, which can be designed e.g. as PROFINET. The internet connectivity (represented in FIG. 1 by a solid double line) is provided exclusively via the gateway GW. The gateway GW and the field devices FG and the controller PLC communicate via a field bus B as will be described later in more detail with reference to FIG. 5. FIG. 1 shows that the field bus B—shown by a broken line—is a different interface than the web-based interface between the gateway GW and the server S (which can be based e.g. on a http or http/s protocol). Since different interfaces/protocols are involved, the messages exchanged thereby cannot be transmitted unchanged but must be "converted". The controller PLC does not have web connectivity and, with the architecture in accordance with the disclosure, can nevertheless (indirectly) use web-based services for diagnosis of the field devices FG.

In the exemplary embodiment shown in FIG. 1, a separate gateway GW is provided which serves as an intermediary between the server S and the field device FG and/or the programmable logic controller PLC.

Figure 2:
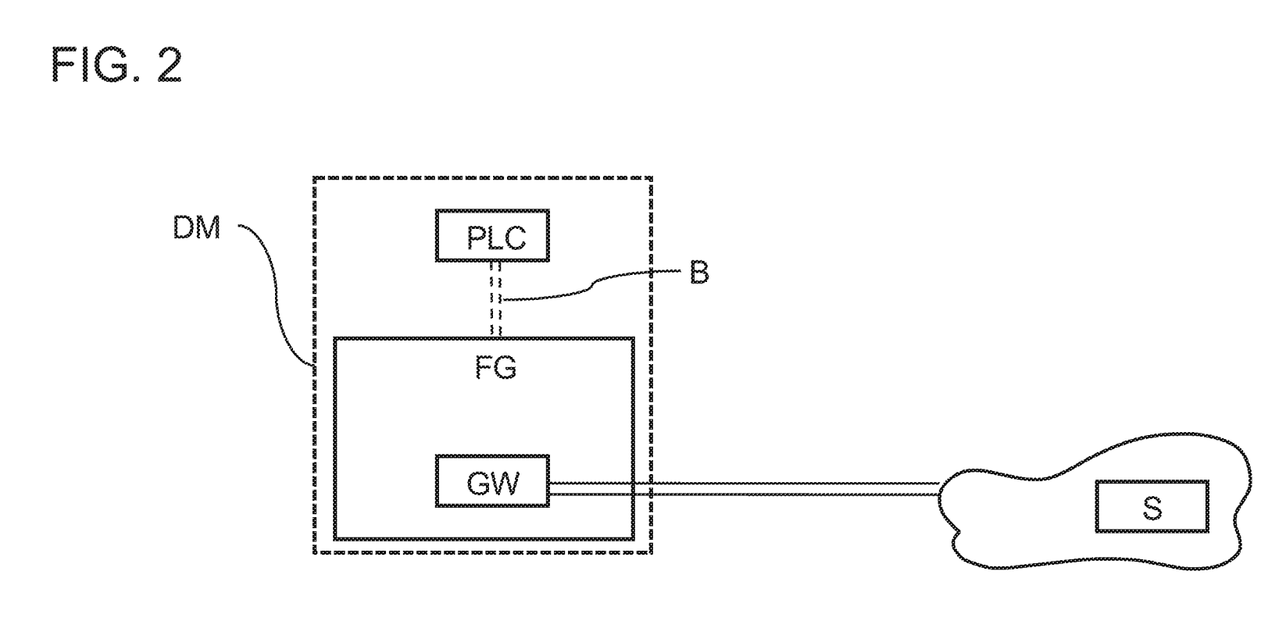
FIG. 2 shows an embodiment of a field device with an integrated conversion module which is an alternative to the illustration in FIG. 1.

FIG. 2 shows an alternative exemplary embodiment in which the gateway GW is not provided as a separate component part but is integrated into one of the field devices FG. Out of the number of field devices, at least one then has the gateway or coupling functionality (interne connectivity). In this exemplary embodiment, the role or task of the gateway GW is delegated to the at least one field device FG. The role can also be delegated to a plurality of field devices FG and therefore be assumed in a distributed manner.

Figure 3:
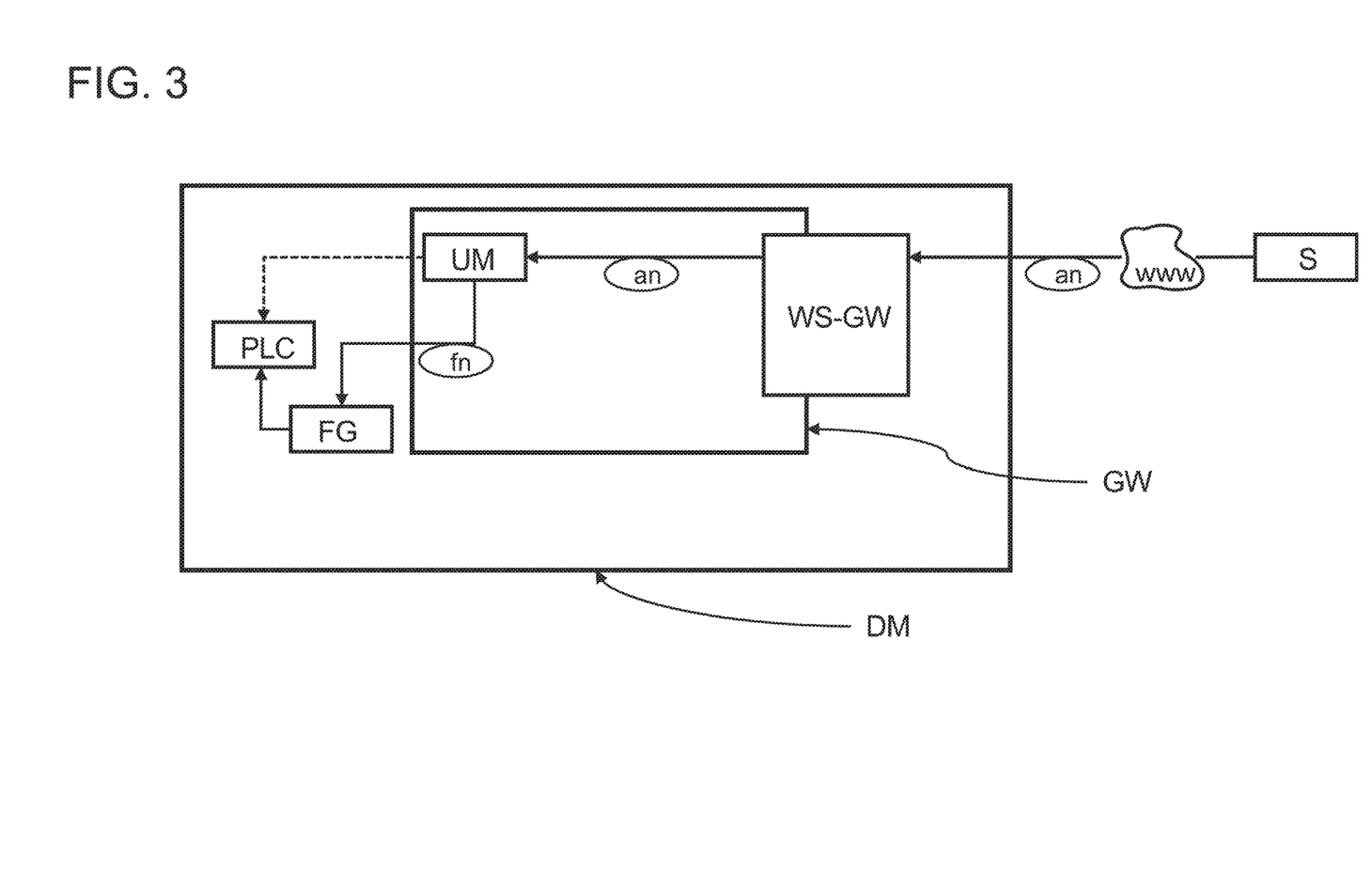
FIG. 3 shows a detailed view of a diagnostic module with further component parts.

FIG. 3 shows the diagnostic module DM with the gateway GW in more detail. The gateway GW is equipped with a web interface WS-GW for data communication with the cloud-based server S. In this way, in particular, an analysis message an can be received from the cloud-based server S. The analysis message an is the result of an analysis algorithm for predictive maintenance which is executed on the server S. The result in the form of the analysis message an is forwarded via the web interface WS-GW and from there further to a conversion module UM. The conversion module UM is designed to transform the received analysis message an into a field bus message fn. For this purpose, usually a series of computing calculation steps is required. In particular, a protocol conversion must be carried out.

The field bus message fn is configured in such a way that it can be transmitted via the local field bus system B to a field device FG and from there to the programmable logic controller PLC. The programmable logic controller PLC can actuate the field device FG in a modified manner in response to the received field bus message. In an alternative embodiment of the disclosure, the field bus message fn can be transmitted from the conversion module UM not to the field device FG but directly to the programmable logic controller PLC. This is illustrated in FIG. 3 by broken lines.

Figure 4:
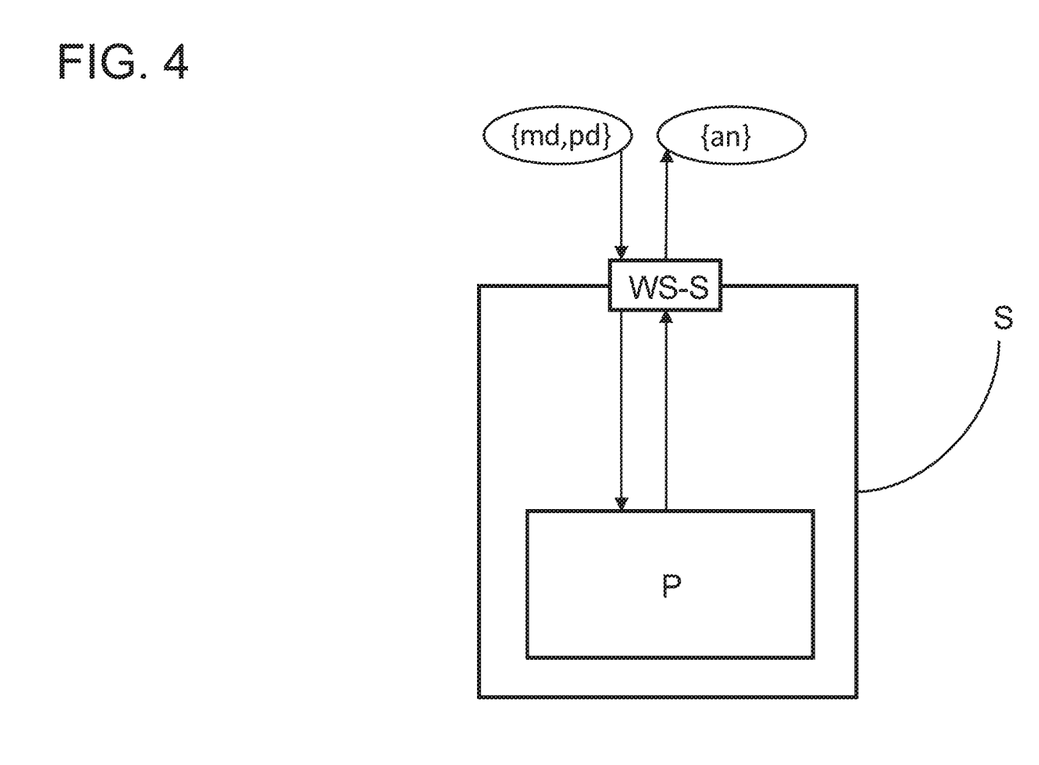
FIG. 4 shows a detailed view of a server.

The server S is illustrated schematically in FIG. 4, being equipped with a web interface WS-S via which it receives and transmits data and communicates with the gateway GW of the diagnostic module DM. Furthermore, it has a processor P as a computer-based processing unit (e.g. consisting of a plurality of processors) for carrying out predictive maintenance methods. For this purpose, the processor P receives the monitoring data md aggregated from a plurality of field devices FG. Optionally, further process data pd can also be received. From these data and possibly further metadata, the processor computes an analysis result and provides this in the form of the analysis message an, which is transmitted to the diagnostic module DM and its component parts as described above in conjunction with FIG. 3. The monitoring data md and/or process data pd can be transmitted to the server cyclically (e.g., in configurable time intervals). However, the analysis result in the form of the analysis message an is typically not transmitted cyclically (back) to component parts of the plant AA, in particular to the gateway GW, but in an event-based manner and in particular when the analysis or server-side evaluation indicates maintenance of a field device or components thereof. In this case, in a preparation phase, configurations can be made as to the conditions under which, and/or the events following which, the analysis message an is to be transmitted to the coupling module GW.

Figure 5:
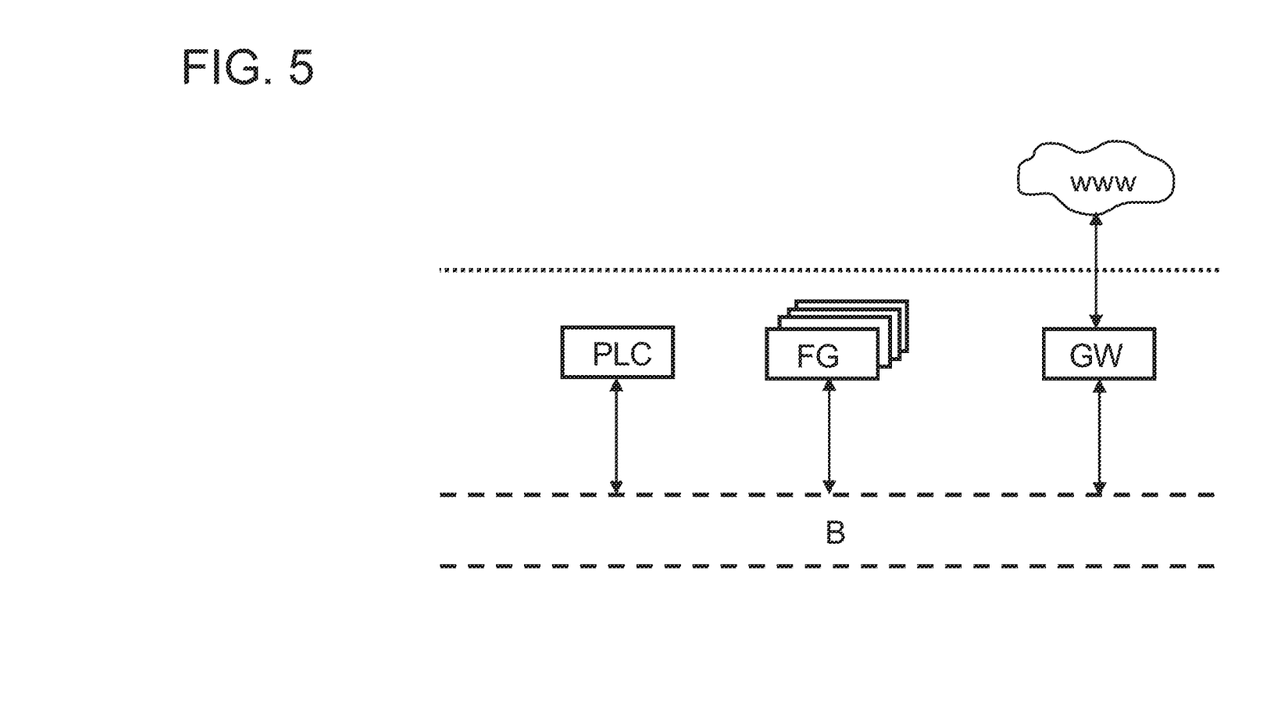
FIG. 5 shows component parts of an automation plant, connected in terms of data technology via a field bus.

The programmable logic controller PLC, the number of field devices FG and the gateway GW are in data exchange via the bus system B. As shown in FIG. 5, only the gateway GW is arranged to communicate externally with the internet www via corresponding protocols (e.g., ip-based protocols) and therefore with the server S. The programmable logic controller PLC does not have to have any internet connectivity whatsoever. The functionality of the gateway GW can also be implemented in at least one field device FG.

Figure 6:
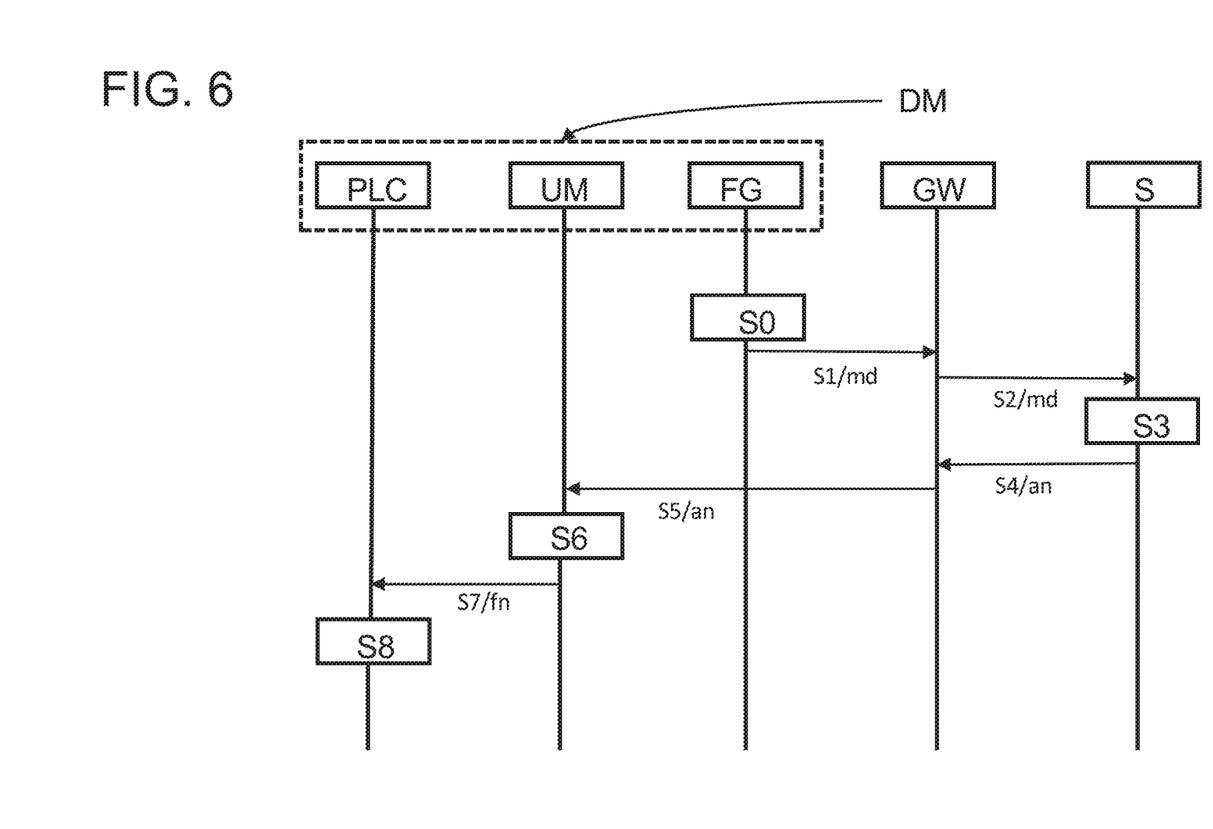
FIG. 6 shows an interaction diagram relating to the message exchange between the respective component parts.

FIG. 6 is an interaction diagram for data exchange between the component parts involved: the programmable logic controller PLC, a field device FG—representative of a number of field devices FG to be monitored—the gateway GW and the server S.

In an upstream step S0, monitoring data md are detected and aggregated at the field devices FG. For this purpose, a memory (not shown in the figures) can be provided. The gathered data are gathered from all field devices FG and, in step S1, transmitted as monitoring data md to the gateway GW. The gateway GW transmits the monitoring data md in step S2—optionally also enriched with further data (e.g. metadata, operating data, etc.)—to the server S. The gateway GW can optionally be arranged to process, e.g., to encrypt, the monitoring data md prior to transmission. This renders the method more secure. In one variation, the monitoring data md can also be compressed in order to have to call on fewer resources for the data transmission to the server S. After reception of the monitoring data md, in step S3 the server S can trigger or initial execution of the predictive maintenance algorithm in order to generate the analysis message an. In one variation, the configuration can be such that the execution of the predictive maintenance algorithm takes place only after reception of a triggering signal. The triggering signal can be, e.g., according to a time-based rule and/or event-based (after reception of a minimum number of monitoring data-transmitting field devices FG etc.). In step S4, the analysis message an is transmitted to the gateway GW which for its part forwards it to the conversion module UM in step S5. The conversion module UM computes from the analysis message an the field bus message fn and transmits the latter, in step S7, to the programmable logic controller PLC. Then in step S8, the programmable logic controller PLC can actuate the field devices in a modified manner in that the parameters of the predictive maintenance algorithm are converted.

Finally, it is noted that the description of the disclosure and the exemplary embodiments are fundamentally to be understood to be non-limiting with respect to a specific physical implementation of the disclosure. All features explained and illustrated in conjunction with individual embodiments of the disclosure can be provided in a different combination in the subject matter in accordance with the disclosure in order to achieve the advantageous effects thereof at the same time.

The scope of protection of the present disclosure is set by the following claims and is not limited by the features explained in the description or shown in the figures.

In particular, for a person skilled in the art it is obvious that the disclosure can be applied not only for specific field devices, e.g., CXP-AP, but also for field devices of other types. Furthermore, the component parts of the diagnostic module DM can be distributed over a plurality of physical products.

It is understood that the foregoing description is that of the exemplary embodiments of the disclosure and that various changes and modifications may be made thereto without departing from the spirit and scope of the disclosure as defined in the appended claims.

What is claimed is:

1. A diagnostic system for technical diagnosis of a plurality of field devices of an automation plant, the diagnostic system comprising:
   a local control device;

each of the plurality of field devices including a field device processor and a memory;
a field bus;
a gateway including a first processor and a web interface, the first processor executing a conversion module, and the field bus being configured to permit communication between the local control device, the plurality of field devices, and the gateway;
a cloud-based server including a web interface and a second processor in communication with the gateway via the web interface, the second processor being configured to execute a predictive maintenance algorithm which, from monitoring data detected at the plurality of field devices and transmitted from the gateway to the cloud-based server, computes an analysis message, and the predictive maintenance algorithm being configured as a switching cycle counter;
the local control device including a circuitry and a field bus interface configured to enable communication of the local control device with the plurality of field devices and with the gateway via the field bus and not being web-enabled;
the web interface of the gateway being configured to receive the analysis message from the cloud-based server;
the conversion module executed on the gateway being configured to generate a field bus message from the analysis message and to transmit the field bus message to the local control device; and
the field bus being configured to forward the field bus message to the local control device to control the automation plant.

2. The diagnostic system as claimed in claim 1, wherein each field device of the plurality of field devices and the gateway are separate component parts.

3. The diagnostic system as claimed in claim 1, wherein the gateway is integrated into one of the plurality of field devices.

4. The diagnostic system as claimed in claim 1, wherein the local control device is not configured to directly exchange the monitoring data with the cloud-based server and in particular is not configured to directly receive the analysis message during cyclic operation of the automation plant.

5. The diagnostic system as claimed in claim 1, wherein the local control device, the at least one field device and the gateway are in data connection via the field bus.

6. The diagnostic system as claimed in claim 1, wherein the conversion module is implemented on at least one field device of the plurality of field devices.

7. A method for diagnosing field devices for operation in an automation plant, comprising the following method steps:
transmitting monitoring data from the field devices to a gateway;
initiating a transmission of the monitoring data from the gateway to a cloud-based server;
generating an analysis message by triggering execution of a predictive maintenance algorithm on the cloud-based server based on the received monitoring data, the predictive maintenance algorithm being configured as a switching cycle counter;
receiving the generated analysis message at the gateway;
transmitting the analysis message from the gateway to a conversion module;
generating a field bus message from the analysis message on the part of the conversion module; and
controlling the automation plant by transmitting the field bus message to a local control device based on the field bus message, wherein the local control device is not web-enabled and not configured to directly communicate with the cloud-based server.

8. The method as claimed in claim 7, wherein one of the field devices participates in the method and can be uniquely identified with an identifier, wherein the identifier is coupled with the respective monitoring data such that the cloud-based server processes the monitoring data in a field device-specific manner and generates the analysis messages likewise in a field device-specific manner such that the analysis message is coupled to the identifier such that the gateway receives the analysis messages together with the identifier and thereupon can transmit them in a dedicated manner to the field device identified with the identifier.

9. The method as claimed in claim 8, wherein, after reception at a diagnostic module and in particular at the field device allocated with the identifier, the analysis message is output directly and locally.

10. The method as claimed in claim 7, wherein, in addition to the monitoring data, the predictive maintenance algorithm also processes historical data and/or reference data in order to generate the analysis message.

11. The method as claimed in claim 7, wherein the predictive maintenance algorithm serves for computation of a diagnostic message included in the analysis message and in particular represents a requirement to exchange a component of the field device or the field device, and wherein the requirement to exchange can be computed from a number of switching cycles of a cylinder.

12. The method as claimed in claim 7, further comprising:
generating the field bus message from the analysis message by carrying out an automatic protocol conversion and/or a change in format.

13. A non-transitory computer-readable storage medium in communication with a processor and encoded with a computer program code, the computer program code, when executed by a processor, causes the processor to carry out all method steps of the method as claimed in claim 7.

14. The method as claimed in claim 9, wherein, after reception at the diagnostic module and in particular at one of the field devices allocated with the identifier, the analysis message is output in an optical form.

* * * * *